United States Patent Office 3,834,981
Patented Sept. 10, 1974

3,834,981
CERAMIC AND GLASS-CERAMIC ARTICLES
PRODUCED FROM BETA-SPODUMENE
David G. Grossman, Painted Post, and Hermann L.
Rittler, Horseheads, N.Y., assignors to Corning Glass
Works, Corning, N.Y.
Filed Oct. 27, 1972, Ser. No. 301,361
Int. Cl. B32b 17/06; C03c 15/00
U.S. Cl. 161—192
9 Claims

ABSTRACT OF THE DISCLOSURE

Low-expansion ceramic and glass-ceramic articles manufactured from beta-spodumene $Li_2O_3$—$Al_2O_3$—$SiO_2$ compositions using a $H^+\rightleftharpoons Li^+$ ion-exchange process which produces a hydroxy-aluminosilicate phase convertible by appropriate heat treatment to desirable aluminosilicate phases are described. The low-expansion ceramic and glass-ceramic articles are useful for certain high-temperature applications where the reactivity of lithium aluminosilicates precludes their use.

BACKGROUND OF THE INVENTION

Figure 1:
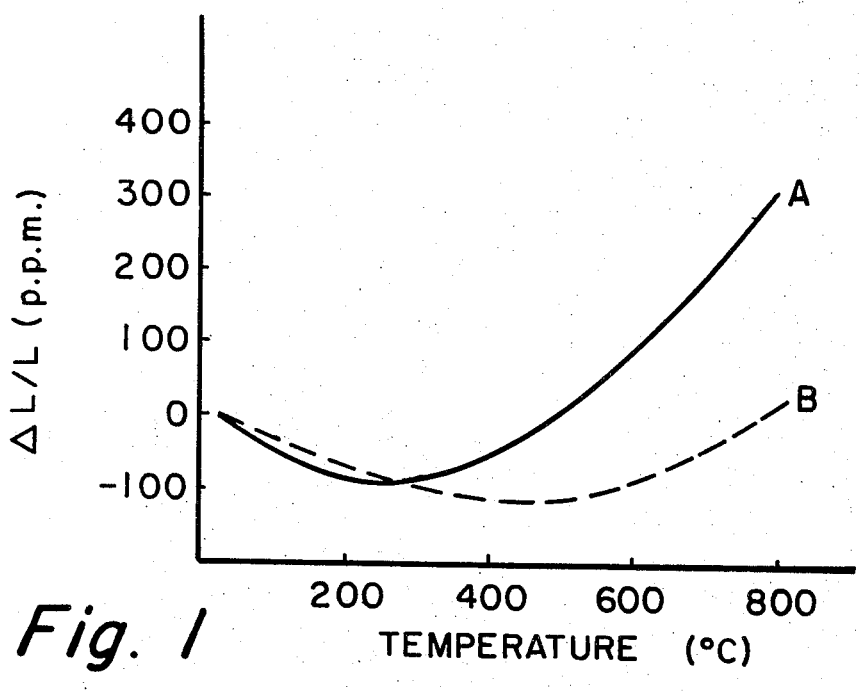

Comparatively recent advances in forming techniques have led to the use of complex glass and ceramic structures for high temperature applications such as heat exchangers and automotive catalyst supports. U.S. Pat. No. 3,112,184 to Hollenbach and 3,607,185 to Andrysiak et al. describe certain of the techniques useful for these purposes, and others are known.

Ceramic structures to be used for high temperature applications should be quite low in thermal expansion in order to minimize thermal stress, so that useful service life may be realized. They should also be non-reactive with respect to their environment at high temperatures. In automotive exhaust applications, for example, high temperatures are accompanied by reducing and oxidizing exhaust gases, sulfur dioxide, water vapor, and oxides of nitrogen. If the effect of these conditions is to partly modify the composition of the ceramic material, rapid degradation of the ceramic structure frequently results.

Lithium aluminosilicate compositions have been widely employed in the manufacture of ceramic structures as above described because they exhibit acceptable melting and forming characteristics and typically produce rather low-expansion crystal phases such as beta-spodumene upon appropriate thermal treatment. However, the presence of alkali in these compositions, while valuable from a melting and forming standpoint, adversely affects the chemical stability of the ceramic under certain high-temperature conditions.

It is known that the alkali present in powdered beta-spodumene may be removed by sulfuric acid leaching, and that a crystalline phase of altered structure containing water is produced as the result. Thus Ostroushko et al. described in the Russian Journal of Inorganic Chemistry, Vol. 7, No. 2, page 126 (1962), the treatment of beta-spodumene powders to extract the lithium therefrom. Whether the resulting powders may be practically formed into a useful article, however, is not disclosed.

We have now discovered that beta-spodumene-type lithium aluminosilicate ceramic articles may be treated with mineral acids to essentially completely replace the lithium therein with hydrogen, that such treatment can modify the crystalline structure of the article without adversely affecting the physical integrity thereof, and that the modified articles may be heat-treated to produce phase transformations which significantly improve the physical and chemical properties thereof for high temperature applications.

Hence, in one aspect, our invention comprises the discovery that useful low-expansion ceramic articles may be produced from beta-spodumene-containing lithium aluminosilicate articles by a process of ion-exchanging to replace the lithium ions therein with hydrogen ions.

In another aspect, our invention comprises a process for producing ultra-low-expansion ceramic articles through a process comprising ion-exchanging lithium aluminosilicate ceramic articles to remove the lithium therefrom and heat-treating the articles to produce low expansion crystal phases therein.

Other aspects and advantages of our invention will become apparent from the following detailed description thereof.

SUMMARY OF THE INVENTION

Briefly, we have discovered a means of manufacturing lithium-free, low-expansion ceramic articles through an $H^+$-for-$Li^+$ ion-exchange treatment of beta-spodumene-containing lithium aluminosilicate ceramics. For the purposes of the present description, the term "ceramics" includes conventional sintered and fusion-cast ceramics as well as so-called "glass-ceramics," which are ceramics produced from glasses of appropriate composition by controlled crystallization. Such glass-ceramics are described, for example, in U.S. Pat. No. 2,920,971 to Stookey.

The beta-spodumene crystals involved in the ion-exchange reaction may arise from essentially any source, including alpha-spodumene, a lithium aluminosilicate glass, a sintered batch of appropriate composition, or a sintered beta-spodumene ceramic article. Also, any of the known beta-spodumene solid solutions, comprising crystals of the formula ($Li_2O$—$Al_2O_3$—$nSiO_2$) wherein $n$ ranges from about 3.5 to about 10, may be treated. This includes compositions containing silica in amounts as high as about 85% by weight. For a further discussion of compositions in the beta-spodumene system suitable for treatment according to the present invention, reference may be made to B. J. Skinner and H. T. Evans, Jr., "Crystal Chemistry of Beta-Spodumene Solid Solutions on the Join $Li_2O \cdot Al_2O_3$—$SiO_2$," Am. J. Sci., Bradley Vol. 258A, 312–24 (1960).

The ion-exchange treatment of the invention comprises the initial step of contacting the beta-spodumene-containing ceramic articles with strong mineral acids at temperatures ranging from about 25°–320° C., for a period of time at least sufficient to permit the exchange of hydrogen ions for lithium ions in the crystals of the ceramic article. The process is time and temperature dependent so that, at higher temperatures, shorter treatments are required. The product of this treatment is a ceramic article containing hydroxy-aluminosilicate crystals having the unit formula ($H_2O \cdot Al_2O_3 \cdot nSiO_2$). Sufficiently long ion-exchange treatments permit essentially complete replacement of lithium in the crystals by hydrogen, resulting in an article wherein the described hydroxy-aluminosilicate crystals constitute the principal crystalline phase.

Following completion of the ion-exchange step, residual acid and lithium-containing residues are removed from the surface of the article, and it is then heated. Heating removes the water from the crystalline lattice and converts the hydroxy-aluminosilicate crystals to non-reactive, low-expansion aluminosilicate crystals. At temperatures in the range from about 350°–1000° C., water is driven off, but the extent of removal is proportional to the temperature of the heat treatment, and temperatures of at least about 1000° C. are required to remove all of the water from the structure.

Examination of a structure from which all of the water has been removed by heat treatment at about 1000° C. as described discloses the presence of aluminosilicate crystals of unestablished composition and structure which have an X-ray diffraction pattern closely resembling that of keatite. Keatite is a synthetic hydrothermal silica form, also referred to in the literature as silica-K. The aluminosilicate crystals produced by this treatment have a negative coefficient of thermal expansion as evidenced by the fact that treatment as described to produce essentially total conversion to keatite-type aluminosilicate crystals produces a negative-expansion body. The crystals are quite probably composed of alumina-silica solid solutions which are iso-structural with keatite, and for the purposes of the present disclosure will be referred to as aluminous keatite. For a further discussion of the nature and structure of keatite, reference may be made to Joseph Shropshire, P. P. Keat, and P. A. Vaughn, "Crystal Structure of Keatite, a New Form of Silica," Z. Krist., Vol. 112, 409–13 (1959).

Articles composed essentially entirely of these aluminous keatite crystals are useful not only for their low thermal expansion characteristic, but also because they are refractory and alkali-free. Hence, articles produced according to the described process contain crystals which consist essentially of silica and alumina in a molar ratio $Al_2O_3:nSiO_2$, wherein $n$ ranges from about 3.5–10, contain only minor or trace amounts of lithium, have solidus temperatures well in excess of the spodumene-containing structures from which they are produced, and are essentially non-reactive at high temperatures even in moist oxidizing or reducing atmospheres.

We have also found that the utility of such aluminosilicate articles may be improved for certain applications through the use of further heat treatment at temperatures in excess of 1000° C. Such heating causes phase transformations from the aluminous keatite structure to mullite ($3Al_2O_3 \cdot 2SiO_2$) and, at temperatures in excess of about 1200° C., cristobalite ($SiO_2$). The extent to which these transformations occur may be controlled by controlling the temperature and time of the heat treatment. Mullite and cristobalite crystals are higher in thermal expansion than is aluminous keatite; thus, a controlled thermal treatment can be used to produce partial transformations which result in a ceramic article of specified crystalline composition and thermal expansion characteristics. For example, articles exhibiting essentially zero average coefficients of thermal expansion over the range from about 0°–800° C. may be obtained.

Figure 2:
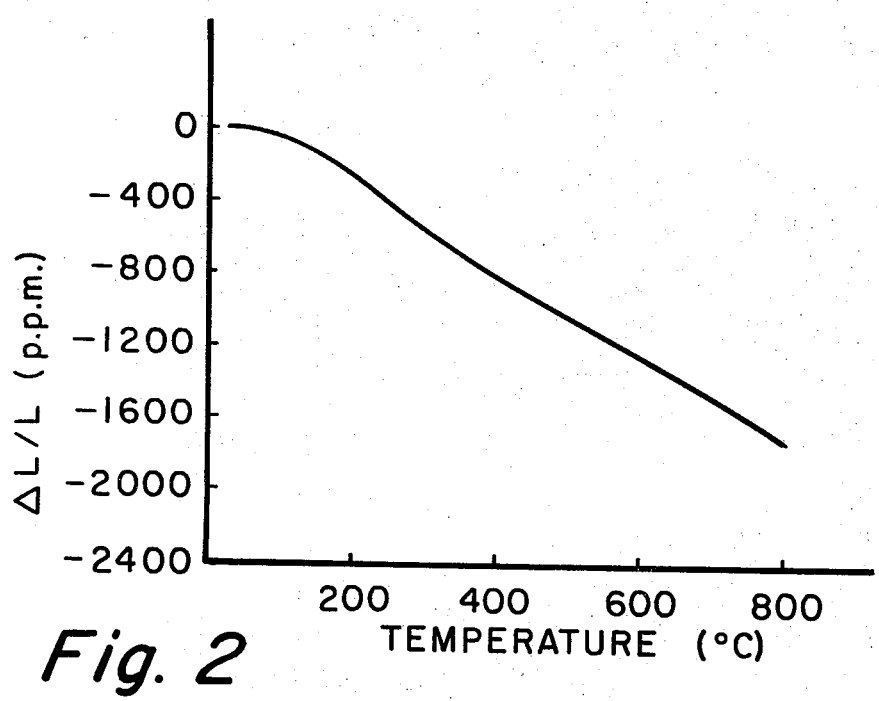

The marked effect of the process of the present invention on the physical properties of beta-spodumene-containing ceramic articles can be observed from the Drawing, wherein:

FIG. 1 is a plot of the thermal expansion curve of a beta-spodumene-containing article before and after treatment according to the present invention, Curve A representing the initial thermal properties and Curve B the final thermal properties of the article; and FIG. 2 is a plot of the thermal expansion curve of an article consisting essentially completely of aluminous keatite produced according to the method of the present invention.

Detailed Description of the Invention

Preferred starting materials for the purpose of the described process include thin-walled glass-ceramic honeycomb structures having a principal crystalline phase consisting essentially of beta-spodumene. These may be prepared from a fairly broad area of lithium aluminosilicate glass composition. Examples of such preferred starting articles include glass-ceramic honeycomb structures produced from multibore tubing such as described in U.S. Pat. No. 3,607,185 to Andrysiak et al. The tubing is formed from a thermally-crystallizable glass, and is bundled to form a honeycomb structure which is then crystallized according to the procedures described in U.S. Pat. No. 2,920,971 to Stookey. Numerous glasses crystallizable to beta-spodumene and thus suitable for this purpose are shown in the aforementioned patent to Stookey.

Other preferred starting structures include thin-walled ceramic honeycomb structures prepared according to the procedures described in U.S. Pat. No. 3,112,184 to Hollenbach. Such structures are characteristically produced by sintering powders to form an article, rather than by thermally-crystallizing a glass article of the desired configuration. For the present purpose, the powders may consist, for example, of mineral beta-spodumene or a lithium aluminosilicate glass which is thermally-crystallizable to beta-spodumene.

Acids suitable for use in the present invention include strong acids, typically strong mineral acids, such as $HNO_3$, HCl and $H_2SO_4$. These are typically although not invariably used in concentrated form; however, aqueous solutions of at least about 2 Normal concentration are also suitable. The acid selected depends in part on the composition and structure of the articles to be treated. In certain cases, as where a beta-spodumene-containing glass-ceramic article selected for treatment comprises a minor glassy phase which partly inhibits the ion-exchange reaction between the acid and the crystals, the use of hydrofluoric acid in the early stages of treatment or in sequential combination with other acids may be required to increase the reaction rate by etching away the glass. Strongly alkaline hydroxide solutions may also be used for this purpose.

The time of ion-exchange treatment with acid may also vary, depending upon the acid selected, the composition and configuration of the article to be treated, and the reaction temperature employed. The ion-exchange reaction is both time and temperature dependent so that, at lower temperatures, longer reaction times are typically required. Increased bulk of the treated article also increases the treatment time. Typically treatments of at least about 2 hours are required even at maximum permissible reaction temperatures. Thus, for example, substantially complete exchange of hydrogen-for-lithium in a beta-spodumene ceramic honeycomb structure having cell walls not exceeding about 7 mils in thickness requires from 2–6 hours in concentrated $H_2SO_4$ at 200° C. Significantly longer treatments of up to about 55 hours or more may be useful at temperatures, for example, in the range from about 25°–90° C., depending upon the composition and structure of the ceramic article and the extent of ion-exchange desired. Acid treatments at temperatures in excess of about 320° C. are not preferred since pressurized reaction vessels to contain the acids would normally be required. Thus, our preferred practice comprises treatments at temperatures below the boiling point of the selected acid.

Suprisingly, such severe treatments do not result in the destruction or disintegration of the ceramic article but simply transform the beta-spodumene crystal phase to a hydroxy-aluminosilicate phase of analogous composition. The structure of the hydroxy-aluminosilicate phase produced by the ion-exchange process is postulated as

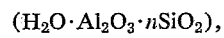
$(H_2O \cdot Al_2O_3 \cdot nSiO_2)$, wherein $n$ ranges from about 3.5 to about 10 and approximately corresponds to the value of $n$ in the original beta-spodumene-containing article. A one-for-one hydrogen-for-lithium exchange is indicated by the fact that heating the ceramic article to a temperature of about 1000° C. results in a loss of water in an amount indicated by the above-postulated unit formula.

The lithium-for-hydrogen ion-exchange reaction which produces the hydroxy-aluminosilicate phase is reversible, and the reverse reaction is favored at higher temperatures. Therefore, all lithium-containing residues of the ion-exchange reaction should be removed from the article prior to heating to convert the hydroxy-aluminosilicate crystals to aluminous keatite.

To obtain complete conversion of the hydroxy-aluminosilicate crystals to aluminous keatite crystals, heating to temperatures of at least about 1000° C. is required. The time of the heat treatment depends in part upon the bulk of the treated article, but typically ranges between about 1–24 hours for complete conversion.

X-ray diffraction techniques are useful in following the modifications in crystal structure in a beta-spodumene ceramic article as the crystal phase is transformed from beta-spodumene to hydroxy-aluminosilicate and thereafter to the aluminous keatite form. Table I below sets forth characteristic interplanar spacings $(d)$ and intensities $(I/I_1)$ which were observed for beta-spodumene, hydroxy-aluminosilicate, and aluminous keatite crystalline powder samples taken from articles before, during and after treatment according to the invention. Also included are similar data for Silica K (keatite) as taken from ASTM Card No. 13-26, Joint Committee on Powder Diffraction Standards, Swarthmore, Pa. The approximate molar ratio of the composition components $Li_2O$, $Al_2O_3$ and $SiO_2$ present in the beta-spodumene solid solutions treated is 1:1:8.

TABLE I.—X-RAY DIFFRACTION DATA

| Beta-spodumene (n=8) | | Hydroxy-aluminosilicate | | Aluminous keatite | | Silica K (keatite) | |
|---|---|---|---|---|---|---|---|
| d(A.) | I/I₁ | d(A.) | I/I₁ | d(A.) | I/I₁ | d(A.) | I/I₁ |
| 5.84 | 30 | | | | | 7.46 | <2 |
| | | | | 5.68 | 5 | | |
| | | | | | | 5.64 | 5 |
| | | | | | | 5.28 | 5 |
| 4.62 | 50 | 4.56 | 30 | | | | |
| | | | | 4.53 | 15 | | |
| | | | | | | 4.50 | 20 |
| 3.90 | 60 | | | | | | |
| | | | | 3.79 | 40 | | |
| | | 3.74 | 60 | | | | |
| | | | | | | 3.72 | 70 |
| 3.49 | 100 | 3.49 | 100 | | | | |
| | | | | 3.44 | 100 | | |
| | | | | | | 3.42 | 100 |
| | | | | | | 3.35 | 20 |
| | | | | 3.33 | 20 | | |
| 3.16 | 50 | 3.16 | 50 | | | | |
| | | | | 3.12 | 15 | | |
| | | | | | | 3.11 | 20 |
| | | 2.64 | 5 | | | | |
| 2.63 | 10 | | | | | | |
| | | | | 2.54 | 5 | | |
| | | | | | | 2.52 | 5 |
| | | 2.50 | 15 | | | | |
| | | 2.39 | 1 | | | | |
| 2.30 | 20 | 2.30 | 10 | | | | |
| | | 2.26 | 10 | | | | |
| 2.25 | 15 | | | 2.25 | 5 | 2.25 | 5 |
| | | | | 2.18 | 10 | | |
| 2.17 | 5 | 2.17 | 25 | | | 2.17 | 5 |
| | | | | | | 2.15 | 5 |
| | | 2.12 | 10 | | | | |
| 2.11 | 20 | | | | | | |
| 2.09 | 5 | | | | | | |
| | | | | 2.08 | 5 | | |
| | | | | | | 2.07 | 5 |
| | | 2.03 | 5 | | | | |
| | | | | 2.01 | 1 | | |
| | | | | | | 1.99 | 2 |
| 1.93 | 50 | | | | | | |
| 1.88 | 60 | 1.88 | 40 | 1.88 | 10 | 1.88 | 5 |
| | | | | 1.87 | 20 | | |
| | | | | | | 1.86 | 10 |
| | | 1.83 | 20 | 1.83 | 10 | | |
| | | 1.79 | 5 | | | | |
| 1.74 | 5 | | | | | | |
| | | 1.72 | 5 | | | | |
| 1.69 | 5 | | | | | | |
| | | 1.68 | 10 | | | | |
| | | | | 1.67 | 1 | 1.67 | 5 |
| | | 1.66 | 5 | | | | |
| 1.65 | 20 | | | | | | |
| | | 1.64 | 5 | 1.64 | 1 | 1.64 | 1 |
| 1.63 | 20 | | | | | | |
| | | | | 1.60 | 1 | | |
| 1.59 | 5 | | | | | 1.59 | 2 |
| | | 1.58 | 10 | 1.58 | 5 | | |
| | | | | | | 1.56 | 5 |
| | | 1.54 | 20 | | | | |
| 1.53 | 10 | | | | | | |
| | | | | 1.50 | 5 | | |
| | | | | | | 1.49 | 5 |

From the above data, the modifications in crystal structure occurring as the result of the ion-exchange treatment and the similarity between the aluminous keatite and keatite patterns are evident.

Thermal expansion data provide a further means for evaluating changes in crystal structure which occur during the conversion process. As previously mentioned, heating at about 1000° C. for a time sufficient to obtain essentially complete conversion to aluminous keatite typically produces an article with a negative average linear coefficient of thermal expansion over the range from about 25°–800° C. As used herein, the term linear coefficient of thermal expansion is defined as the fractional change in length per unit length which is observed in an article as it is heated one Centigrade degree, and the average linear coefficient of expansion is the arithmetic average of these coefficients over a range of temperatures. The actual average linear coefficient of thermal expansion observed in an article produced according to the present invention is dependent in part on the presence or absence of other oxides therein such as $TiO_2$, $MgO$, $ZnO$, $B_2O_3$, $P_2O_5$, $Na_2O$, etc., but articles consisting essentially completely of aluminous keatite crystals typically have negative average linear thermal expansion coefficients.

FIG. 2 of the drawing illustrates the behavior of an aluminous keatite-containing sample produced according to the method of the present invention as it is heated over the range from about 25°–800° C. The drawing is a plot of the fractional change in length of the article in parts per million as it is heated over the above temperature range. The average linear coefficient of thermal expansion of the article as calculated from FIG. 1 is about $-22.4 \times 10^{-7}/°$ C. over the specified range. The article was produced from a beta-spodumene-containing ceramic honeycomb structure consisting essentially, in weight percent on the oxide basis, of about 71.8% $SiO_2$, 23.0% $Al_2O_3$, 5.05% $Li_2O$ and minor amounts of titania, potash, soda and impurities, by a process comprising immersion in concentrated sulfuric acid for 6 hours at 200° C., washing, and heating at 1000° for 1½ hours to remove essentially all of the water from the crystal structure.

For certain applications it is useful to obtain articles with even smaller coefficients of thermal expansion than are obtained by conversion to the aluminous keatite structure as hereinabove described. We have found that further heating an article which has been converted to aluminous keatite at temperatures somewhat in excess of 1000° C. results in the formation within the article of mullite

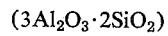

$$(3Al_2O_3 \cdot 2SiO_2)$$

and, at higher temperatures, cristobalite crystal phases. These crystal phases are somewhat higher in thermal expansion than the aluminous keatite phase initially produced, and their formation produces an increase in the coefficient of thermal expansion of the article. We have also found that the growth of these higher expansion phases may be controlled by controlling the temperature of the heat treatment. Through the use of controlled heat treatment, therefore, we can control the crystal phase distribution and thus the thermal expansion of the treated article.

More specifically, we have found that articles demonstrating near-zero average coefficients of thermal expansion may be produced by heating an ion-exchanged ceramic article at temperatures in the range from about 1050°–1200° C., preferably in the range from about 1080°–1150° C. Heating at temperatures below about 1050° C. does not significantly modify the aluminous keatite structure, and an article having a small negative average coefficient of thermal expansion is obtained. On the other hand, at temperatures above about 1200° C. the generation of higher-expansion mullite and, particularly, cristobalite phases becomes increasingly rapid, and control of the phase distribution in the treated article is quite difficult. Preferably then, heat treatments in the range from about 1080°–1150° C. will be employed.

At temperatures within the described preferred range, the time of treatment is not overly critical. Thus, treatments of between 2 and 24 hours in the preferred temperature range typically produce articles having near-zero thermal expansion coefficients. Such articles may be characterized as having a principal crystal phase consisting essentially of aluminous keatite and mullite, with at most only minor amounts of cristobalite, rutile and other non-essential crystal phases present.

FIG. 1 of the drawing sets forth thermal expansion data of the kind shown in FIG. 2 for two additional ceramic articles. Curve A is a thermal expansion curve generated by a beta-spodumene-containing ceramic honeycomb structure consisting, in weight percent on the oxide basis, of about 71.8% $SiO_2$, 23.0% $Al_2O_3$, 5.05% $Li_2O$, and minor amounts of titania, potash, soda and impurities. This structure is essentially identical to the structure treated to produce the data shown in FIG. 2, and has an average coefficient of thermal expansion, as calculated from the data shown in FIG. 1, of about $+4.1 \times 10^{-7}/°$ C. over the range 25°–800° C.

Curve B is a thermal expansion curve of a beta-spodumene ceramic honeycomb article, initially of identical composition and structure to the above, after treatment for 6 hours in concentrated sulfuric acid at 200° C., washing, and heating at 1100° C. for 6 hours to obtain an ultra-low expansion article. X-ray diffraction data show the presence of both aluminous keatite and mullite crystals in the crystal phase. Calculation from the data shown in FIG. 1 indicates an average coefficient of thermal expansion over the range 25°–800° C. of about $+0.13 \times 10^{-7}/°$ C. for this article.

Example I

A glass-ceramic honeycomb structure formed by thermal crystallization of a glass consisting essentially, in weight percent on the oxide basis as calculated from the batch, of about 64.5% $SiO_2$, 18.9% $Al_2O_3$, 3.7% $Li_2O$, 2.5% ZnO, 4.4% $TiO_2$, 5.0% $B_2O_3$, 0.8% $As_2O_3$ and 0.2% F. is selected for treatment. The article has a principal crystal phase consisting essentially of beta-spodumene solid solution, and has an average coefficient of thermal expansion of about $45 \times 10^{-7}/°$ C. over the range from 25°–800° C.

The structure is ion-exchange treated by immersion in concentrated sulfuric acid at 90° C. for 32 hours. It is then removed from the acid and rinsed with distilled water to remove all lithium-containing residues of the ion exchange treatment.

Following the ion-exchange treatment the article is heated in air to a temperature of about 1050° C., maintained at that temperature for about 16 hours, and finally cooled to room temperature.

Examination of the product of the above treatment discloses a strong integral article essentially identical in size and configuration with the initial structure. Thermal expansion measurements show a decrease in the average coefficient of thermal expansion over the range from 25°–800° C. to about $-1.0 \times 10^{-7}/°$ C. The article has a deformation temperature in excess of about 1400° C., as compared to about 1250° C. for the original beta-spodumene structure from which it is produced.

Further ion-exchange treatments and post-ion-exchange heat treatments are shown in Table II below, along with the initial and final properties of the treated articles. Articles of two different compositions are treated; those denoted Composition 1 correspond in composition to the article treated in Example I above, and those denoted Composition 2 consist essentially in weight percent on the oxide basis as calculated from the batch, of about 68.5% $SiO_2$, 18.2% $Al_2O_3$, 4.0% $Li_2O$, 1.2% ZnO, 4.6% $TiO_2$, 2.5% $B_2O_3$ and 1.0% $As_2O_3$. All of the articles were thermally crystallized to beta-spodumene glass-ceramics. The articles of Composition 1 had average coefficients of thermal expansion (25°–900° C.) in the range from about 40–$49 \times 10^{-7}/°$ C. and the articles of Composition 2 had coefficients ranging from about $22–28 \times 10^{-7}/°$ C., depending in each case on the maximum crystallization temperature employed in manufacture. The analyzed lithium content of the articles after treatment is reported as percent $Li_2O$ by weight where measured. All of the reported ion-exchange treatments were carried out at temperatures in the range from about 25°–90° C.

TABLE II

| Article number | Composition | Ion-exchange treatment | Post ion-exchange heat treatment | Average coefficient of thermal expansion (25–900° C.) ($\times 10^7/°$ C.) Before | After | Residual lithium content (wt. percent $Li_2O$) |
|---|---|---|---|---|---|---|
| 1 | 2 | 4 hours—concentrated $HNO_3$ | 24 hours—1,200° C | >22.0 | 16.5 | 2.9 |
| 2 | 2 | 48 hours—concentrated $HNO_3$ | 24 hours—1,050° C | >22.0 | 10.1 | |
| 3 | 2 | 24 hours—concentrated HCl | 24 hours—1,050° C | >22.0 | 14.2 | |
| 4 | 2 | 24 hours—concentrated $H_2SO_4$ | 24 hours—1,000° C | >22.0 | −3.9 | |
| 5 | 1 | 10 min.—10% HF; 5 hours—2N. $HNO_3$ | 2 hours—1,000° C | >40.0 | 6.6 | |
| 6 | 1 | 10 min.—20% HF; 6 hours—6N. HCl; 6 hours—3N. $HNO_3$; 10 min.—20% HF; 6 hours—6N. HCl. | 16 hours—1,000° C | >40.0 | 4.8 | 2.6 |
| 7 | 1 | 10 min.—10% HF; 24 hours—2N. NaOH; 6 hours—6N. HCl; 6 hours—2N. $HNO_3$. | 16 hours—1,100° C | >40.0 | 11.8 | |
| 8 | 1 | 10 min.—10% HF; 24 hours—2N. $HNO_3$; 6 hours—2N. $HNO_3$; 10 min.—10% HF; 24 hours—6N. HCl. | 16 hours—1,000° C | >40.0 | 5.2 | 1.4 |
| 9 | 1 | 10 min.—10% HF; 24 hours—2N. $HNO_3$; 6 hours—2N. $HNO_3$; 10 min.—10% HF; 24 hours—6N. HCl. | 16 hours—1,000° C | >40.0 | 6.1 | 1.1 |
| 10 | 1 | 10 min.—10%HF; 24 hours—2N. $HNO_3$; 6 hours—2N. $HNO_3$; 10 min.—10% HF; 24 hours—6N. HCl. | 16 hours—1,000° C.; 16 hours—1,400° C. | >40.0 | 58.1 | 1.1 |
| 11 | 1 | 20 min.—10% HF; 24 hours—2N. NaOH; 24 hours—6N. HCl; 24 hours—2N $HNO_3$. | 16 hours—1,000° C | >40.0 | 9.8 | 0.7 |
| 12 | 1 | 20 min.—10% HF; 6 hours—2N. NaOH; 16 hours—2N. NaOH; 6 hours—6N. HCl; 6 hours—2N. $HNO_3$. | 16 hours—1,000° C | >40.0 | 2.6 | |
| 13 | 1 | 15 min.—5%HF; 24 hours—2N. NaOH; 24 hours—6N. HCL; 24 hours—2N. $HNO_3$. | 16 hours—1,000° C | >40.0 | 1.5 | 1.7 |
| 14 | 1 | 10 min.—2.5% HF; 1 hour—6N. HCl; 1 hour—2N. NaOH; 10 min.—3N. $H_2SO_4$; 1 hour—2N. $HNO_3$. | 24 hours—1,000° C | >40.0 | 11.3 | |

From a review of the data shown in Table II, it is apparent that a wide range of ion-exchange treatments and heat treatments are useful in carrying out the process of the present invention. The use of hydrofluoric acid and alkaline NaOH solutions shown in Table II is helpful to etch away glassy phases which interfere with the ion-exchange reaction between the acids and the beta-spodumene crystals. Such treatments can increase both the rate and extent of the ion-exchange reaction where glassy phases are present; however, hydrofluoric acid treatments should not be continued for periods longer than are necessary to remove residual glass, since attack on the basic crystal structure and disruption of the article could result. The use of heat treatments in excess of about 1200° C. is ordinarily not preferred since, as shown by Article 10, complete conversion to higher-expansion mullite phases may occur.

Example 2 below illustrates in greater detail the means by which ion-exchange treatment according to the present invention may be usefully carried out at higher temperatures.

Example 2

A ceramic honeycomb structure consisting essentially, in weight percent on the oxide basis, of about 71.8% $SiO_2$, 23.0% $Al_2O_3$, 5.05% $Li_2O$, and minor amounts of titania, potash, soda and impurities is selected for treatment. The structure is composed principally of beta-spodumene crystals, contains essentially no glassy phases, and has an average linear coefficient of thermal expansion over the range from 25°–800° C. of about $4.1 \times 10^{-7}/°$ C. or about 0.41 parts per million per degree Centigrade.

The structure is immersed in concentrated (36 Normal) sulfuric acid at 200° C., maintained therein for 6 hours, removed, and washed to remove lithium-containing residues of the ion-exchange reaction. It is then heated to a temperature of about 1100° C., maintained at that temperature for about 24 hours, and finally cooled to room temperature.

Examination of the structure after treatment discloses a strong, integral structure essentially identical in size and configuration with the original article. Thermal expansion measurements show a decrease in the average coefficient of thermal expansion to about $0.13 \times 10^{-7}/°$ C., or about 0.013 parts per million per degree Centigrade over the range from about 25°–800° C. Chemical analysis indicates a reduction in lithium content from about 5.05% $Li_2O$ by weight to less than 0.05% $Li_2O$ by weight. X-ray diffraction studies show major aluminous keatite and mullite crystal phases present in the article.

Treatments such as are described above, involving relatively high temperature (150°–250° C.) immersion in strong sulfuric acid solutions (18–36 Normal) are preferred for complete removal of lithium from ceramic honeycomb structures where no glassy phases are present. The rate and extent of the ion-exchange reaction are increased at these reaction temperatures, and no detrimental effects on the physical integrity of the structure are observed.

The above results clearly illustrate a method of producing ultra-low expansion, low-alkali refractory materials from readily-melted and formed lithium aluminosilicate glasses and ceramics. Thus conventional glass and ceramic forming means can be used to provide the necessary article configurations, and our process can then be employed to modify the composition, microstructure and physical properties of the articles. The products of the invention provide important material advantages in addition to low thermal expansion, including resistance to chemical attack and stability in the hydrocarbon combustion exhaust environment.

It will, of course, be appreciated that, while the invention has been described primarily in terms of the utility of completely transforming the crystalline structure of a ceramic article, the methods herein described have obvious application to the modification of a portion of an article such as a surface layer in order to improve the chemical and physical properties thereof.

We claim:

1. A ceramic article containing in at least a portion thereof aluminosilicate crystals produced by the extraction of $Li_2O$ from beta spodumene crystals present in the article prior to said extraction, said aluminosilicate crystals having:
    (a) a molar composition $(Al_2O_3 \cdot nSiO_2)$ wherein $n$ is within the range of about 3.5–10;
    (b) a negative coefficient of thermal expansion; and
    (c) an X-ray diffraction pattern which substantially conforms to the pattern shown in Table I of the specification for aluminous keatite.

2. A ceramic article according to claim 1 wherein said aluminosilicate crystals constitute a principal crystal phase in said ceramic article.

3. A ceramic article according to claim 1 which additionally contains mullite $(3Al_2O_3 \cdot 2SiO_2)$ crystals.

4. A ceramic article according to claim 1 which consists essentially of said mullite crystals and said aluminosilicate crystals.

5. A process for modifying the crystalline structure of a beta-spodumene-containing ceramic article, said article having a principal crystal phase consisting essentially of beta-spodumene solid solutions of the formula $$[Li_2O \cdot Al_2O_3 \cdot nSiO_2],$$

wherein $n$ ranges from about 3.5 to 10, which comprises the steps of:
    (a) contacting the article with a strong mineral acid at temperatures in the range from about 25°–320° C. for a period of time at least sufficient to obtain the replacement of lithium in said crystal phase by hydrogen and the generation of a hydroxy-aluminosilicate crystal phase consisting essentially of solid solutions of the formula $[H_2O \cdot Al_2O_3 \cdot nSiO_2]$, wherein $n$ ranges from about 3.5 to 10;
    (b) removing from the surface of the article residual strong mineral acid and lithium present thereon, if any; and,
    (c) heating the article to a temperature of at least about 1000° C. for a period of time at least sufficient to essentially completely remove $H_2O$ from said hydroxy-aluminosilicate crystal phase and to generate therefrom aluminosilicate crystals having a molar composition $[Al_2O_3 \cdot nSiO_2]$, wherein $n$ is within the range from about 3.5 to 10, said aluminosilicate crystals having an X-ray diffraction pattern which substantially conforms to the pattern shown in Table I of the specification for aluminous keatite.

6. A process according to claim 5 wherein said article is contacted by immersion in a strong mineral acid selected from the group consisting of HCl, $HNO_3$, and $H_2SO_4$.

7. A process according to claim 6 wherein said article is contacted by immersion in a sulfuric acid solution ranging from about 18–36 Normal at a temperature in the range from about 150°–250° C. for a period of time sufficient to essentially completely replace said lithium in said crystal phase with hydrogen.

8. A process according to claim 6 wherein the article is heated to a temperature in the range from about 1000°–1200° C. for a period of time in the range from about 1–24 hours to generate crystals selected from the group consisting of mullite, cristobalite, and said aluminosilicate crystals having an X-ray diffraction pattern substantially conforming to the pattern shown in Table I of the specification for aluminous keatite.

9. A process according to claim 7 wherein the article is heated to a temperature in the range from about 1080°–1150° C. for a period of time in the range from about 1–24 hours to generate a principal crystal phase consisting essentially of mullite crystals and aluminosilicate crystals having an X-ray diffraction pattern which substantially conforms to the pattern shown in Table I of the specification for aluminous keatite.

References Cited
UNITED STATES PATENTS

| | | | |
|---|---|---|---|
| 3,112,184 | 11/1963 | Hollenbach | 161—68 X |
| 2,472,490 | 6/1949 | Plank | 252—432 |
| 3,637,453 | 1/1972 | Simmons | 161—192 X |
| 3,573,075 | 3/1971 | Karstetter | 65—30 X |
| 3,647,489 | 3/1972 | McMillan | 65—30 X |

GEORGE F. LESMES, Primary Examiner

P. C. IVES, Assistant Examiner

U.S. Cl. X.R.

161—68; 65—30, 33; 106—65, 52, 39.7

UNITED STATES PATENT OFFICE
CERTIFICATE OF CORRECTION

Patent No. 3,834,981    Dated September 10, 1974

Inventor(s) David G. Grossman and Hermann L. Rittler

It is certified that error appears in the above-identified patent and that said Letters Patent are hereby corrected as shown below:

Column 1, line 58, "described" should be -- describe, --.

Column 7, line 48, insert the paragraph -- The following specific examples illustrate in greater detail some of the various procedures which may be employed in carrying out the process of the present invention. --

Signed and sealed this 26th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,834,981  Dated September 10, 1974

Inventor(s) David G. Grossman et al.

It is certified that error appears in the above-identified patent and that said Letters Patent are hereby corrected as shown below:

Column 5, line 36 (in Table 1--X-Ray Diffraction Data) in the Hydroxy-aluminosilicate column, "3.35  50" should appear below -- 3.49  100 --.

in the Silica K column, "3.35  2" should appear as -- 3.33  20 --.

Signed and Sealed this twenty-sixth Day of July 1977

[SEAL]

Attest:

RUTH C. MASON
Attesting Officer

C. MARSHALL DANN
Commissioner of Patents and Trademarks